US006635698B2

(12) United States Patent
Goossens et al.

(10) Patent No.: US 6,635,698 B2
(45) Date of Patent: Oct. 21, 2003

(54) FLAME RETARDANT POLYCARBONATE POLYESTER COMPOSITION

(75) Inventors: Johannes Martinus D. Goossens, Bergen op Zoom (NL); Walter C. M. van der Heijden, Oosterhout (NL); Gabrie Hoogland, Breda (NL); Johannes Jacobus M. de Moor, Bergen op Zoom (NL); Hendrik Verhoogt, Bergen op Zoom (NL)

(73) Assignee: General Electric Company, Pittsfield, MA (US)

(*) Notice: Subject to any disclaimer, the term of this patent is extended or adjusted under 35 U.S.C. 154(b) by 220 days.

(21) Appl. No.: 09/747,053

(22) Filed: Dec. 22, 2000

(65) Prior Publication Data

US 2002/0128357 A1 Sep. 12, 2002

(51) Int. Cl.$^7$ .................. C08K 5/521; C08K 5/524; C08K 3/32
(52) U.S. Cl. .................. 524/126; 524/127; 524/140; 524/141; 524/145; 524/147; 524/417; 524/439
(58) Field of Search ................ 524/126, 127, 524/140, 141, 145, 147, 414, 417; 525/439

(56) References Cited

U.S. PATENT DOCUMENTS

| | | | | |
|---|---|---|---|---|
| 2,465,319 A | 3/1949 | Whinfield et al. | ............. | 526/71 |
| 2,675,390 A | 4/1954 | Rosenblatt | .................. | 548/579 |
| 2,888,484 A | 5/1959 | Denm et al. | ................. | 562/509 |
| 2,999,835 A | 9/1961 | Goldberg | ..................... | 524/267 |
| 3,028,365 A | 4/1962 | Schnell et al. | ............... | 528/196 |
| 3,047,539 A | 7/1962 | Pengilly | ..................... | 528/285 |
| 3,153,008 A | 10/1964 | Fox | ............................. | 528/196 |
| 3,334,154 A | 8/1967 | Kim | ............................ | 525/469 |
| 3,444,237 A | 5/1969 | Jaffe | ............................ | 560/127 |
| 3,635,895 A | 1/1972 | Kramer | ....................... | 525/462 |
| 4,001,184 A | 1/1977 | Scott | ........................... | 528/182 |
| 4,123,436 A | 10/1978 | Holub et al. | ................. | 524/289 |
| 4,131,575 A | 12/1978 | Adelmann et al. | ........... | 524/311 |
| 4,754,064 A | 6/1988 | Lillwitz | ...................... | 563/509 |
| 5,441,997 A | 8/1995 | Walsh et al. | ................. | 524/147 |
| 5,859,119 A * | 1/1999 | Hoefflin | ...................... | 524/494 |
| 5,907,026 A * | 5/1999 | Factor et al. | ................ | 528/196 |
| 5,942,585 A | 8/1999 | Scott et al. | ................... | 526/439 |
| 6,221,556 B1 * | 4/2001 | Gallucci et al. | ........... | 428/64.7 |

FOREIGN PATENT DOCUMENTS

| | | | |
|---|---|---|---|
| WO | 63002 | * | 12/1999 |
| WO | WO 99 63002 A | | 12/1999 |
| WO | WO 00/26287 | | 5/2000 |
| WO | WO 00 52096 A | | 9/2000 |

OTHER PUBLICATIONS

Mechanical Behaviour of Miscible Polycarbonate Blends, by A. J. Hill et al, J. Phys.: Condens Matter, 8, 3811–3827 (1996).

Dynamic Mechanical and Dielectric Relaxation Study of Aliphatic Polyester Based Blends by Stack et al., J.M. Polym. Mater. Sci. Eng. (1993), 69, 4–5, Eastman Chemical Company, Kingsport, TN 37662.

Friefelder et al., Journal of Organic Chemistry, 31, 3438 (1966).

* cited by examiner

*Primary Examiner*—Peter Szekely

(57) ABSTRACT

A transparent/translucent flame redardant composition comprises a uniform blend of a miscible resin blend of a polycarbonate resin and a cycloaliphatic polyester resin wherein the composition has at least a 80% pass rate in 10 test specimen in the Norme Francaise NF-P-92-505 flammability test of L'Association Francaise de Normalisation using test specimens with weight between about 1.0 to about 6.0 kilograms per square meter.

19 Claims, No Drawings

FLAME RETARDANT POLYCARBONATE POLYESTER COMPOSITION

FIELD OF THE INVENTION

This invention relates to flame retardant thermoplastic molding compositions.

BACKGROUND OF THE INVENTION

Polycarbonate sheet shows good performance and receives high ratings in several European fire tests, especially those for building and construction applications. The NF-P-92-507 norm for France divides sheet into 4 classes (M1 to M4) based on their burning behavior in the main test with electric heater or epiradiateur test (NF-P-92-501) and, if necessary, the flame propagation test (NF-P-92-504) and the melting or dripping test (NF-P-92-505). The classification of materials is determined by flame height(s), flame ignition time, total burning time (all in epiradiateur test), after flame time (flame propagation test) and dripping of burning particles (melting test).

For polycarbonate based sheet the classification is usually determined by the results obtained in the dripping test. Polycarbonate sheets of several design types and thickness may have M4 ratings due to the performance in the dripping test because burning particles may ignite the underlying cotton. Hence, it is desirable to enhance the performance of polycarbonate sheets to a more desirable rating of M1 or M2.

Typical commercial grades of polycarbonate sheets are made from linear or branched polycarbonate resin having a Melt Volume Rate (MVR) of about 5 cm$^3$/10 min (300° C./1.2 kg), measured according ISO1133. It has been found that the pass rate of polycarbonate in the dripping test (NF-P-92-505) can be improved by lowering the viscosity of the polycarbonate material (see, for example, International Publication No. WO 00/26287). However, as a consequence the impact performance of the sheet will be lowered.

U.S. Pat. No. 5,942,585 to Scott et al relates to clear blends of polycarbonates and polyesters where the polyester comprises a dicarboxylic acid component based on 1,4-cyclohexanedicarboxylic acid units and a glycol component comprising 2,2,4,4-tetramethyl-1,3-cyclobutanediol units. Miscible polycarbonate polyester blends are described in a Free Volume approach to the Mechanical Behaviour of Miscible Polycarbonate Blends, by A. J. Hill et al, J. PHYS.: Condens Matter, 8, 3811–3827 (1996) and in Dynamic Mechanical and Dielectric Relaxation Study of Aliphatic Polyester Based Blends by Stack et al., J. M. Polym. Mater. Sci. Eng. (1993), 69, 4–5, Eastman Chemical Company, Kingsport, Tenn. 37662. These references focus on the transparent properties of the miscible blends.

Because of use of polycarbonate for forming transparent/translucent sheet material used in building and construction, enhancements to the flame retardancy of the material is desirable.

SUMMARY OF THE INVENTION

Addition of poly(cyclohexane dimethanol cyclohexane dicarboxylate) (PCCD) to polycarbonate (PC) results in an improved performance in the dripping test. The two polymers are completely miscible and mixing results in transparent translucent blends, having a single T$_g$ and excellent impact performance. The polycarbonate/poly(cyclohexane dimethanol cyclohexane dicarboxylate) (PCCD) compositions having a specific Melt Volume rate (MVR) have a higher pass rate in the dripping test than comparable polycarbonate compositions (with a similar MVR) that do not contain PCCD.

A transparent/translucent molding composition with improved flame redardancy comprising a uniform blend of a miscible resin blend of a polycarbonate resin and a cycloaliphatic polyester resin. The cycloaliphatic polyester resin comprising the reaction product of an aliphatic C$_2$–C$_{20}$ diol or chemical equivalent and a C$_6$–C$_{20}$ aliphatic diacid or chemical equivalent. The cycloaliphatic polyester resin contains at least about 80% by weight of cycloaliphatic components wherein the composition has at least a 80% pass rate in 10 test specimen in the Norme Francaise NF-P-92-505 flammability test of L'Association Francaise de Normalisation using test specimens with density between about to 1.0 about 6.0 kilograms per square meter.

In general, preferred polyester molecules are derived from cycloaliphatic diol and cycloaliphatic diacid compounds, specifically polycyclohexane dimethanol cyclohexyl dicarboxylate (PCCD). The polyester having only one cyclic unit may also be useful.

DETAILED DESCRIPTION OF THE INVENTION

The most preferred materials are blends where the polyester has both cycloaliphatic diacid and cycloaliphatic diol components specifically polycyclohexane dimethanol cyclohexyl dicarboxylate (PCCD). The preferred polycarbonate comprises units of bisphenol-A-polycarbonate (BPA), 6,6'-dihdyroxy-3,3,3',3'-tetramethyl-1,1'-spiro(bis)indane (SBI), aryl substituted bisphenols, cycloaliphatic bisphenols and mixtures thereof.

The ratio of polycarbonate to cycloaliphatic polyester is desirable from about 75:25 to 99:1 by weight, more preferable from about 90:10 to 99:1 by weight, most preferable from 95:5 to 98:2 by weight of the entire mixture.

The cycloaliphatic polyester resin comprises a polyester having repeating units of the formula I:

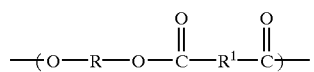

where at least one R or R1 is a cycloalkyl containing radical.

The polyester is a condensation product where R is the residue of an aryl, alkane or cycloalkane containing diol having 6 to 20 carbon atoms or chemical equivalent thereof, and R1 is the decarboxylated residue derived from an aryl, aliphatic or cycloalkane containing diacid of 6 to 20 carbon atoms or chemical equivalent thereof with the proviso that at least one R or R1 is cycloaliphatic. Preferred polyesters of the invention will have both R and R1 cycloaliphatic.

The present cycloaliphatic polyesters are condensation products of aliphatic diacids, or chemical equivalents and aliphatic diols, or chemical equivalents. The present cycloaliphatic polyesters may be formed from mixtures of aliphatic diacids and aliphatic diols but must contain at least 50 mole % of cyclic diacid and/or cyclic diol components, the remainder, if any, being linear aliphatic diacids and/or diols. The cyclic components are necessary to impart good rigidity to the polyester and to allow the formation of transparent/translucent blends due to favorable interaction with the polycarbonate resin.

The polyester resins are typically obtained through the condensation or ester interchange polymerization of the diol or diol equivalent component with the diacid or diacid chemical equivalent component.

R and R1 are preferably cycloalkyl radicals independently selected from the following formula:

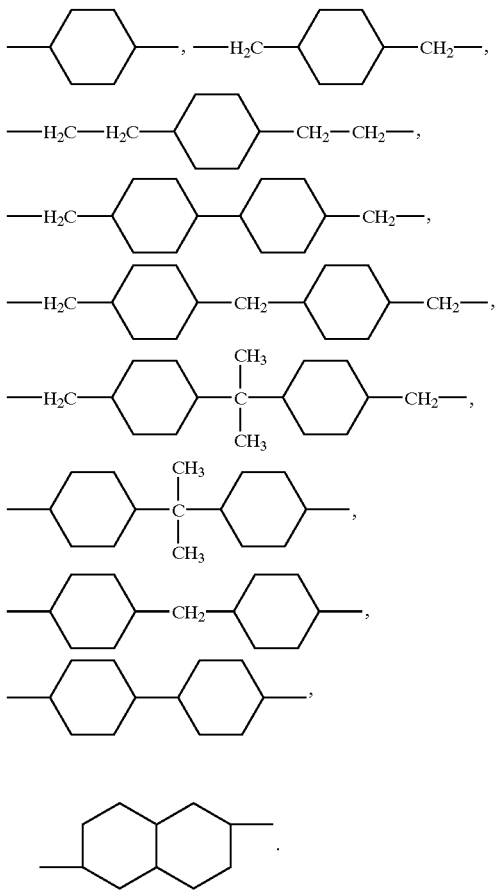

The preferred cycloaliphatic radical R1 is derived from the 1,4-cyclohexyl diacids and most preferably greater than 70 mole % thereof in the form of the trans isomer. The preferred cycloaliphatic radical R is derived from the 1,4-cyclohexyl primary diols such as 1,4-cyclohexyl dimethanol, most preferably more than 70 mole % thereof in the form of the trans isomer.

Other diols useful in the preparation of the polyester resins of the present invention are straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; 2,2,4,4-tetramethyl-1,3-cyclobutanediol (TMCBD), triethylene glycol; 1,10-decane diol; and mixtures of any of the foregoing. Preferably a cycloaliphatic diol or chemical equivalent thereof and particularly 1,4-cyclohexane dimethanol or its chemical equivalents are used as the diol component.

Chemical equivalents to the diols include esters, such as dialkylesters, diaryl esters and the like.

The diacids useful in the preparation of the aliphatic polyester resins of the present invention preferably are cycloaliphatic diacids. This is meant to include carboxylic acids having two carboxyl groups each of which is attached to a saturated carbon. Preferred diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or chemical equivalent. Linear dicarboxylic acids like adipic acid, azelaic acid, dicarboxyl dodecanoic acid and succinic acid may also be useful.

Cyclohexane dicarboxylic acids and their chemical equivalents can be prepared, for example, by the hydrogenation of cycloaromatic diacids and corresponding derivatives such as isophthalic acid, terephthalic acid or naphthalenic acid in a suitable solvent such as water or acetic acid using a suitable catalysts such as rhodium supported on a carrier such as carbon or alumina. See, Friefelder et al., Journal of Organic Chemistry, 31, 3438 (1966); U.S. Pat. Nos. 2,675,390 and 4,754,064. They may also be prepared by the use of an inert liquid medium in which a phthalic acid is at least partially soluble under reaction conditions and with a catalyst of palladium or ruthenium on carbon or silica. See, U.S. Pat. Nos. 2,888,484 and 3,444,237.

Typically, in the hydrogenation, two isomers are obtained in which the carboxylic acid groups are in cis- or trans-positions. The cis- and trans-isomers can be separated by crystallization with or without a solvent, for example, n-heptane, or by distillation. The cis-isomer tends to blend better; however, the trans-isomer has higher melting and crystallization temperatures and may be preferred. Mixtures of the cis- and trans-isomers are useful herein as well.

When the mixture of isomers or more than one diacid or diol is used, a copolyester or a mixture of two polyesters may be used as the present cycloaliphatic polyester resin.

Chemical equivalents of these diacids include esters, alkyl esters, e.g., dialkyl esters, diaryl esters, anhydrides, salts, acid chlorides, acid bromides, and the like. The preferred chemical equivalents comprise the dialkyl esters of the cycloaliphatic diacids, and the most favored chemical equivalent comprises the dimethyl ester of the acid, particularly dimethyl-1,4-cyclohexane-dicarboxylate.

A preferred cycloaliphatic polyester is poly(cyclohexane-1,4-dimethylene cyclohexane-1,4-dicarboxylate) also referred to as poly(1,4-cyclohexane-dimethanol-1,4-dicarboxylate) (PCCD) which has recurring units of formula II:

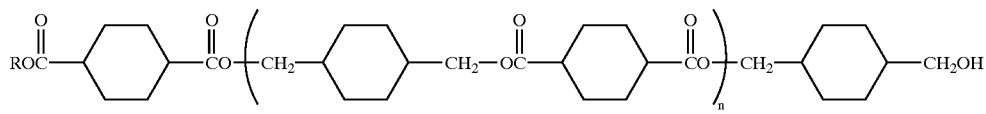

In formula II, R is H or a lower alkyl. With reference to the previously set forth general formula, for PCCD, R is derived from 1,4 cyclohexane dimethanol; and R1 is a cyclohexane ring derived from cyclohexanedicarboxylate or a chemical equivalent thereof. The favored PCCD has a cis/trans formula.

The polyester polymerization reaction is generally run in the melt in the presence of a suitable catalyst such as a tetrakis (2-ethyl hexyl) titanate, in a suitable amount, typically about 50 to 200 ppm of titanium based upon the final product.

Preferred cycloaliphatic polyesters will have weight average molecular weights (determined by gel permeation chromatography using polystyrene standards) of about 30,000 to about 150,000 atomic mass units (amu), with about 60,000 to about 100,000 amu being preferred, and about 65,000 to about 95,000 amu being more preferred. Preferred cycloaliphatic polyesters will also have viscosities of about 500 to about 25,000 poise, with about 1,000 to about 20,000 poise being preferred, and about 2,000 to about 4,000 poise being more preferred.

The preferred aliphatic polyesters used in the present transparent/translucent molding compositions have a glass transition temperature (Tg) which is above 50° C., more preferably above 80° C. and most preferably above about 100° C.

Also contemplated herein are the above polyesters with from about 1 to about 50 percent by weight, of units derived from polymeric aliphatic acids and/or polymeric aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

Typical polycarbonates comprise the divalent residue of dihydric phenols, Ar', bonded through a carbonate linkage and are preferably represented by the general formula III:

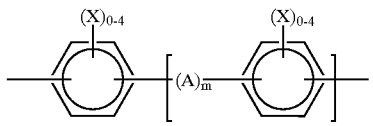

wherein A is a divalent hydrocarbon radical containing from 1 to about 15 carbon atoms or a substituted divalent hydrocarbon radical containing from 1 to about 15 carbon atoms; each X is independently selected from the group consisting of hydrogen, halogen, and a monovalent hydrocarbon radical such as an alkyl group of from 1 to about 8 carbon atoms, an aryl group of from 6 to about 18 carbon atoms, an arylalkyl group of from 7 to about 14 carbon atoms, an alkoxy group of from 1 to about 8 carbon atoms; and m is 0 or 1 and n is an integer of from 0 to about 5. Ar' may be a single aromatic ring like hydroquinone or resorcinol, or a multiple aromatic ring like biphenol or bisphenol A.

The dihydric phenols employed are known, and the reactive groups are thought to be the phenolic hydroxyl groups. Typical of some of the dihydric phenols employed are bis-phenols such as bis(4-hydroxyphenyl)methane, 2,2-bis(4-hydroxyphenyl)propane (also known as bisphenol-A), 2,2-bis(4-hydroxy-3,5-dibromo-phenyl)propane; dihydric phenol ethers such as bis(4-hydroxyphenyl)ether, bis(3,5-dichloro-4-hydroxyphenyl)ether; p,p'-dihydroxydiphenyl and 3,3'-dichloro-4,4'-dihydroxydiphenyl; dihydroxyaryl sulfones such as bis(4-hydroxyphenyl)sulfone, bis(3,5-dimethyl-4-hydroxyphenyl)sulfone, dihydroxy benzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl)sulfide, bis(4-hydroxy-phenyl)sulfoxide and bis(3,5-dibromo-4-hydroxyphenyl)sulfoxide. A variety of additional dihydric phenols are available and are disclosed in U.S. Pat. Nos. 2,999,835, 3,028,365 and 3,153,008; all of which are incorporated herein by reference. It is, of course, possible to employ two or more different dihydric phenols or a combination of a dihydric phenol with a glycol.

The carbonate precursors are typically a carbonyl halide, a diarylcarbonate, or a bishaloformate. The carbonyl halides include, for example, carbonyl bromide, carbonyl chloride, and mixtures thereof. The bishaloformates include the bishaloformates of dihydric phenols such as bischloroformates of 2,2-bis(4-hydroxyphenyl)-propane, hydroquinone, and the like, or bishaloformates of glycol, and the like. While all of the above carbonate precursors are useful, carbonyl chloride, also known as phosgene, and diphenyl carbonate are preferred.

The aromatic polycarbonates can be manufactured by any processes such as by reacting a dihydric phenol with a carbonate precursor, such as phosgene, a haloformate or carbonate ester in melt or solution. U.S. Pat. No. 4,123,436 describes reaction with phosgene and U.S. Pat. No. 3,153,008 describes a transesterification process.

Preferred polycarbonate will be made of dihydric phenols that result in resins having low birefringence for example dihydric phenols having pendant aryl or cup shaped aryl groups like:

Phenyl-di(4-hydroxyphenyl) ethane (acetophenone bisphenol):

Diphenyl-di(4-hydroxyphenyl) methane (benzophenone bisphenol):

2,2-bis(3-phenyl-4-hydroxyphenyl) propane
2,2-bis-(3,5-diphenyl-4-hydroxyphenyl) propane;
bis-(2-phenyl-3-methyl-4-hydroxyphenyl) propane;
2,2'-bis(hydroxyphenyl)fluorene;
1,1-bis(5-phenyl-4-hydroxyphenyl)cyclohexane;
3,3'-diphenyl-4,4'-dihydroxy diphenyl ether;
2,2-bis(4-hydroxyphenyl)-4,4-diphenyl butane;
1,1-bis(4-hydroxyphenyl)-2-phenyl ethane;
2,2-bis(3-methyl-4-hydroxyphenyl)-1-phenyl propane;
6,6'-dihdyroxy-3,3,3',3'-tetramethyl-1,1'-spiro(bis)indane;
(hereinafter "SBI"), or dihydric phenols derived from spiro biindane of formula IV:

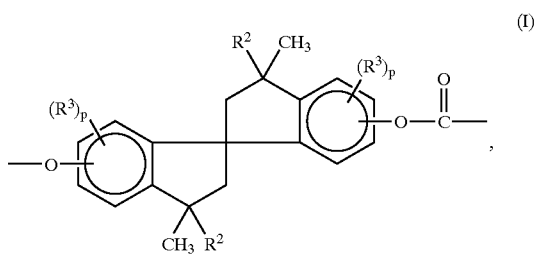

Units derived from SBI and its 5-methyl homologue are preferred, with SBI being most preferred.

Other dihydric phenols which are typically used in the preparation of the polycarbonates are disclosed in U.S. Pat. Nos. 2,999,835, 3,038,365, 3,334,154 and 4,131,575. Branched polycarbonates are also useful, such as those described in U.S. Pat. Nos. 3,635,895 and 4,001,184. Polycarbonate blends include blends of linear polycarbonate and branched polycarbonate.

It is also possible to employ two or more different dihydric phenols or a copolymer of a dihydric phenol with an aliphatic dicarboxylic acids like; dimer acids, dodecane dicarboxylic acid, adipic acid, azelaic acid in the event a carbonate copolymer or interpolymer rather than a homopolymer is desired for use in the preparation of the polycarbonate mixtures of the invention. Most preferred are aliphatic C5 to C12 diacid copolymers.

The preferred polycarbonates are preferably high molecular weight aromatic carbonate polymers having an intrinsic viscosity (as measured in methylene chloride at 25° C.) ranging from about 0.30 to about 1.00 dl/gm. Polycarbonates may be branched or unbranched and generally will have a weight average molecular weight of from about 10,000 to about 200,000, preferably from about 20,000 to about 100,000 as measured by gel permeation chromatography. It is contemplated that the polycarbonate may have various known end groups.

In the thermoplastic compositions which contain a cycloaliphatic polyester resin and a polycarbonate resin it is preferable to use a stabilizer or quencher material. Catalyst quenchers are agents which inhibit activity of any catalysts which may be present in the resins. Catalyst quenchers are described in detail in U.S. Pat. No. 5,441,997. It is desirable to select the correct quencher to avoid color formation and loss of clarity to the polyester polycarbonate blend.

A preferred class of stabilizers including quenchers are those which provide a transparent/translucent and colorless product. Typically, such stabilizers are used at a level of 0.001–10 weight percent and preferably at a level of from 0.005–2 weight percent. The favored stabilizers include an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate or a mixture thereof. The suitability of a particular compound for use as a stabilizer and the determination of how much is to be used as a stabilizer may be readily determined by preparing a mixture of the polyester resin component and the polycarbonate and determining the effect on melt viscosity, gas generation or color stability or the formation of interpolymer. The acidic phosphate salts include sodium dihydrogen phosphate, mono zinc phosphate, potassium hydrogen phosphate, calcium dihydrogen phosphate and the like. The phosphites may be of the formula V:

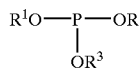

where R1, R2 and R3 are independently selected from the group consisting of hydrogen, alkyl and aryl with the proviso that at least one of R1, R2 and R3 is hydrogen.

The phosphate salts of a Group IB or Group IIB metal include zinc phosphate and the like. The phosphorus oxo acids include phosphorous acid, phosphoric acid, polyphosphoric acid or hypophosphorous acid.

The polyacid pyrophosphates may be of the formula VI:

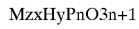

wherein M is a metal, x is a number ranging from 1 to 12 and y is a number ranging from 1 to 12, n is a number from 2 to 10, z is a number from 1 to 5 and the sum of (xz)+y is equal to n+2. The preferred M is an alkaline or alkaline earth metal.

The most preferred quenchers are oxo acids of phosphorus or acidic organo phosphorus compounds. Inorganic acidic phosphorus compounds may also be used as quenchers, however they may result in haze or loss of clarity. Most preferred quenchers are phosphoric acid, phosphorous acid or their partial esters.

Additionally, additives such as antioxidants, thermal stabilizers, mold release agents, antistatic agents, whitening agents, colorants, plasticizers, minerals such as talc, clay, mica, barite, wollastonite and other stabilizers including but not limited to UV stabilizers, such as benzotriazole, supplemental reinforcing fillers such as flaked or milled glass, and the like, flame retardants, pigments, additional resins or combinations thereof may be added to the compositions of the present invention. The different additives that can be incorporated in the compositions are commonly used and known to one skilled in the art. Illustrative descriptions of such additives may be found in R. Gachter and H. Muller, Plastics Additives Handbook, 4th edition, 1993.

Examples of thermal stabilizers include triphenyl phosphite, tris-(2,6-dimethylphenyl)phosphite, tris-(2,4-di-t-butyl-phenyl) phosphite, tris-(mixed mono-and di-nonylphenyl)phosphite, dimethylbenzene phosphonate and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl)propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of the antistatic agents include glycerol monostearate, sodium stearyl sulfonate, and sodium dodecylbenzenesulfonate. Examples of mold releasing agents include pentaerythritol tetrastearate, stearyl stearate, beeswax, montan wax, and paraffin wax. Examples of other resins include but are not limited to polypropylene, polystyrene, polymethyl methacrylate, and polyphenylene oxide. Combinations of any of the foregoing additives may be used. Such additives may be mixed at a suitable time during the mixing of the components for forming the composition.

The production of the compositions may utilize any of the blending operations known for the blending of thermoplastics, for example blending in a kneading machine such as a Banbury mixer or an extruder. The sequence of addition is not critical but all components should be thoroughly blended.

To prepare the resin composition, the components may be mixed by any known methods. Typically, there are two distinct mixing steps: a premixing step and a melt mixing step. In the premixing step, the dry ingredients are mixed together. The premixing step is typically performed using a tumbler mixer or ribbon blender. However, if desired, the premix may be manufactured using a high shear mixer such as a Henschel mixer or similar high intensity device. The premixing step is typically followed by a melt mixing step in which the premix is melted and mixed again as a melt. Alternatively, the premixing step may be omitted, and raw materials may be added directly into the feed section of a melt mixing device, preferably via multiple feeding systems. In the melt mixing step, the ingredients are typically melt kneaded in a single screw or twin screw extruder, a Banbury mixer, a two roll mill, or similar device.

In a preferred embodiment, the composition will have a Melt Volume Rate (MVR) measured at 300° C./1.2 kg according to ISO 1133 of about 5 to about 25, preferable from about 5 to about 11, more preferably from about 5 to about 7. In another preferred embodiment, the transmittance after molding or extrusion is preferably greater than about 80% and more preferably greater than about 85%, as measured on 3.2 mm thick plaques according ASTM D1003. Haze after molding or extrusion, as measured on 3.2 mm thick plaques according ASTM D1003, will be below 5% in the preferred composition. The Yellowness Index (YI) after molding or extrusion, as measured on 3.2 mm thick plaques according ASTM D1925, will be less than 10, preferably less than 5 for the preferred composition. An Izod Notched Impact measured at room temperature according ISO 180/1A of greater than or equal to 60 KJ/m$^2$ is preferred for molded bars, with an Izod Notched Impact of greater than or equal to 65 KJ/m$^2$ being more preferred.

The glass transition temperature of the preferred blend is from about 60° C. to about 150° C., more preferably from 120° C. to about 150° C.

In addition there are many different government-mandated tests for evaluating the fire resistance of thermoplastics, such as polycarbonate sheet building materials. One of the more aggressive tests is French norm NF-P-92-505 (Norme Francaise NF-P-92-505 of L'Association Francaise de Normalisation (AFNOR), Paris, France). In this test, a radiator is placed above a specimen of the test material supported on a grid. Cotton wool is placed in a receptacle below the test material. During the test, the radiator is turned on for 10 minutes, and droplets from the specimen may fall through the grid onto the cotton wool. If the cotton wool burns, the specimen is considered as failing the test.

Therefore, in still another embodiment the resinous compositions of this invention may consist of blends with a polycarbonate to cycloaliphatic polyester ratio from about 90:10 to 99:1 by weight, preferably a ratio 95:5 and most preferably a ratio 98:2, to provide at least a 80% pass rate in ten test specimens in French flammability test NF-P-92-505 when measured on test specimens with weight between about 1.0 to about 6.0 kilograms per square meter. For typical solid sheet material test specimens comprising bisphenol A polycarbonate a weight between about 1.2 to about 6.0 kilograms per square meter corresponds to a thickness of between about 1.0 to about 5.0 millimeters. In a preferred embodiment the test specimen has a weight of about 3.6 kilograms per square meter and a corresponding thickness of about 3 millimeters.

The optical properties and impact resistance of the composition make it suitable for use in building and construction industries, especially for use in a variety of glazing applications, for example, roofs, greenhouses, sun rooms, swimming pool enclosures, and the like.

The composition may be shaped into a final article by various techniques known in the art such as injection molding, extrusion, gas assist blow molding, or vacuum forming. A desirable form is an extruded sheet, including solid sheets, multi-wall sheets, and profiled sheets. There is no particular limitation on the composition of additional layers used to form coextruded sheets. There is no particular limitation on the structure or geometry of the multi-wall sheets. The additional layers may comprise, for example, fluorescing agents to facilitate manufacturing and/or ultraviolet light absorbers to improve weatherability. The extruded solid sheets typically have a weight from about 0.5 to about 15 kilograms per square meter, and typically have a thickness from about 0.5 mm to about 15 mm, preferably from about 1 mm to about 12 mm. The extruded multi-wall sheets typically have a weight from about 0.5 to about 8 kilograms, and typically have a thickness of about 2 to about 50 mm, preferable from about 4 to about 40 mm.

EXAMPLES

The following examples employed the materials listed in Table 1 according to the formulations listed in Tables 2–5. All amounts are weight percents based on the total weight of the composition unless otherwise indicated.

All ingredients were mixed in a ribbon blender and extruded on a Wenrer-Pleiderer twin screw extruder at 300° C. to form pellets. The pellets were then fed into an injection moulding machine to mould discs (used to measure optical properties and to cut samples (7 cm×7 cm) for the dripping test) and impact bars.

Optical properties (transmission and haze according ASTM D1003; yellowness index according ASTM D1925) of 3.2 mm thick plaques were measured on a Gardner XL-835 Colorimeter. Impact values were measured on 4 mm thick bars according ISO 180/1A. From the granulate the melt volume rate (MVR) was measured according ISO 1133 (300° C./1.2 kg) in units of cm$^3$/10 min. Vicat B120 temperatures were measured on 4 mm thick bars according ISO 306. Square plaques, cut form the molded discs and having a thickness of 3.2 mm, were tested for the percentage pass in dripping test NF-P-92-505. This test method is Norme Francaise NF-P-92-505 of L'Association Francaise de Normalisation (AFNOR), Paris, France, which is hereby incorporated by reference. In this test, a test sample, having dimensions of 7 cm.×7 cm. and having a minimum weight of 2 grams, is placed on a support grid located thirty millimeters (mm) under a radiator. A drop receptacle containing cotton wool is placed three-hundred mm below the support grid. The radiator is a horizontal 500 Watt electric radiator which irradiates the sample with a radiation intensity of three Watts per square centimeter. The test lasts for a total of ten minutes. If the specimen ignites within the first five minutes after turning on the radiator, the radiator is removed three seconds after ignition and radiation is continued as soon as the specimen extinguishes. During the second five minutes, radiation is maintained regardless of whether the sample burns. During the test, the radiator is operated for ten minutes. A sample fails this test if the cotton wool starts to burn.

TABLE 1

Materials used

| Material | Trade name/Source | Property |
| --- | --- | --- |
| Polycarbonate I | GE Plastics | IV = 58–59 ml/g |
| Polycarbonate II | GE Plastics | IV = 63.2–65.8 ml/g |
| Polycarbonate III | GE Plastics | IV = 46.5–47.5 ml/g |
| Poly(cyclohexane dimethanol cyclohexane dicarboxylate) (2000 poise) | PCCD/Eastman | Mw = 70000 (expressed as PS-data) |
| Tris(2,4-di-t-butylphenyl)phosphite | Irgaphos 168/Ciba | Heat stabilizer |
| Mono zincphosphate (MZP) | MZP/Berkimpex France | Catalyst quencher |
| H$_3$PO$_3$ (45% aqueous solution) | Phosphorous acid/ Caldic | Catalyst quencher |
| Pentaerythritol tetrastearate | Loxiol/Henkel | Release agent |
| 2(2-hydroxy-5-t-octylphenyl)) benzotriazole | Cyasorb UV5411/Cytec | UV-stabilizer |
| a.o. Tetrakis(2,4-di-t.butylphenyl-4,4'-biphenylylene-diphosphonite) | Irgaphos PEPQ/Ciba | Mixture of heat stabilizers |

IV = intrinsic viscosity

A first series of experiments (see Table 2) was done to determine the effect of the addition of PCCD to a polycarbonate formulation. Addition of PPCD to PC results in a lower viscosity as seen by a higher MVR. However, the material is more yellow than plain PC, most likely because of products of a transesterification between PC and PCCD catalysed by residual catalysts. The yellowing can be suppressed when a so-called catalyst quencher (in this case phosphorous acid) is added to the mixture of polymers (formulation #3) which also results in a smaller increase in MVR. The presence of PCCD results in a higher pass rate in the dripping test.

TABLE 2

Example 1

| | 1 | 2 | 3 |
|---|---|---|---|
| Composition (%) | | | |
| Polycarbonate I | 99.85 | 94.85 | 94.84 |
| PCCD (2000 poise) | | 5 | 5 |
| Irgaphos 168 | 0.05 | 0.05 | 0.05 |
| PETS | 0.1 | 0.1 | 0.1 |
| H3PO3 (45% in water) | | | 0.01 |
| Test results | | | |
| MVR (300° C./1.2 kg) | 5.7 | 8.1 | 6.8 |
| Transmission (3.2 mm plaque) | 90.6 | 87.6 | 90.4 |
| Yellowness Index (3.2 mm plaque) | 1.8 | 12.2 | 2.6 |
| Haze (3.2 mm plaque) | 0.3 | 0.6 | 0.4 |
| Dripping test (NF-P-92-505) | | | |
| % pass (9 plaques tested) | 11 | 100 | 89 |

In a second series of experiments (see Table 3) the effect of the type of catalyst quenchers was studied for PC/PCCD blends. Results show that the pass rate in the dripping test is slightly higher when H3PO3 is used instead of MZP while both formulations have similar MVR-values. Also impact values at room temperature are slightly higher when H3PO3 is used.

TABLE 3

Example 2

| | 4 | 5 | 6 |
|---|---|---|---|
| Composition (%) | | | |
| Polycarbonate I | 99.95 | 94.82 | 94.6 |
| PCCD (2000 poise) | | 5 | 5 |
| Irgaphos 168 | 0.05 | 0.1 | 0.2 |
| H3PO3 (45% in water) | | 0.08 | |
| MZP | | | 0.1 |
| PEPQ | | | 0.1 |
| Test Results | | | |
| MVR (300° C./1.2 Kg) | 5.7 | 10.0 | 9.9 |
| Izod Impact,notched, RT (KJ/m2) | 79 | 77 | 67 |
| Transmission (3.2 mm plaque) | 89.8 | 89.2 | 89.7 |
| Haze (3.2 mm plaque) | 0.9 | 1.3 | 1.3 |
| Dripping test (NF-P-92-505) | | | |
| % pass (10 plaques tested) | 10 | 90 | 80 |

A third series of experiments (see Table 4) focussed on the drip performance of PCCD-containing blend having different MVR. Therefore blends were made with polycarbonate resins of different molecular weight. Formulation #11 can be seen as the comparative PC example that has MVR comparable to that of formulation #8.

TABLE 4

Example 3

| | 7 | 8 | 9 | 10 | 11 |
|---|---|---|---|---|---|
| Composition (%) | | | | | |
| Polycarbonate I | 0 | 94.86 | 94.82 | 74.78 | 69.73 |
| Polycarbonate II | 94.82 | 0 | 0 | 20 | 0 |
| Polycarbonate III | 0 | 0 | 0 | 0 | 30 |
| PCCD (2000 poise) | 5 | 5 | 5 | 5 | 0 |
| Irgaphos 168 | 0.1 | 0.1 | 0.1 | 0.1 | 0.1 |
| PETS | 0 | 0 | 0 | 0 | 0.1 |
| H3PO3 (45% in water) | 0.08 | 0.04 | 0.08 | 0.08 | 0 |
| UV-stabilizer | 0 | 0 | 0 | 0 | 0.07 |
| Test results | | | | | |
| MVR (300° C./1.2 kg) | 6.7 | 8.8 | 9.9 | 9.2 | 8.4 |
| Vicat B120 (° C.) | 142 | 141 | 142 | 143 | 145 |
| Izod Impact, notched, RT (KJ/m2) | 70.3 | 68.2 | 68.6 | 68.7 | 67.4 |
| Transmission (3.2 mm plaque) | 89.8 | 90.4 | 90.1 | 89.3 | 90.4 |
| Yellowness index (3.2 mm plaque) | 3.4 | 2.1 | 2.4 | 3.2 | 2.0 |
| Haze (3.2 mm plaque) | 0.9 | 0.4 | 0.5 | 0.9 | 0.5 |
| Dripping test (NF-P-92-505) | | | | | |
| % pass (10 plaques tested) | 80 | 100 | 100 | 100 | 30 |

The results listed in Table 4 show that PCCD-containing blends with a MVR of 6.7 or higher have a pass rate of equal to or larger than 80% in the dripping test. This is significantly higher than the 30% pass rate obtained for a PC-formulation with a MVR of 8.4, indicating that the high pass rate of PCCD-containing blends is not only caused by the increased MVR but most likely by the presence of PCCD. The PCCD-containing materials possess a slightly lower Vicat B-temperature due to the fact that PC and PCCD are miscible and that the blends have one glass transition temperature ($T_g$). Optical properties and impact at room temperature of the PC/PCCD-blends are similar to the reference formulation #11.

In a fourth series of experiments (see Table 5) the focus was to determine the pass rate of PC/PCCD blends with a MVR of about 5. The results show that the presence of PCCD indeed causes an higher pass rate in the dripping test while other properties (optical, impact at room temperature) remain unchanged.

TABLE 5

Example 4

| | 12 | 13 | 14 |
|---|---|---|---|
| Composition (%) | | | |
| Polycarbonate II | 20 | 97.49 | 97.56 |
| Polycarbonate I | 79.57 | | |
| Irgaphos 168 | 0.05 | 0.05 | 0.05 |
| H3PO3 (45% in water) | | 0.04 | 0.04 |
| Color MB | 0.26 | 0.26 | 0.26 |
| UV5411 | 0.07 | 0.07 | |
| PETS | 0.1 | | |
| PCCD 2000 | | 2 | 2 |
| Test results | | | |
| MVR (300° C./1.2 kg) | 5.2 | 5 | 5.1 |
| Izod Impact,notched, RT (KJ/m2) | 70.1 | 69 | 69.6 |
| Vicat B120 (° C.) | 147 | 145 | 146 |
| Transmission (3.2 mm plaque) | 87 | 85.7 | 86.4 |
| Yellowness index (3.2 mm plaque) | 0.9 | 2.3 | 1.4 |
| Haze (3.2 mm plaque) | 2.9 | 3.7 | 3.3 |

TABLE 5-continued

Example 4

|  | 12 | 13 | 14 |
|---|---|---|---|
| Dripping test (NF-P-92-505) | | | |
| % pass (10 plaques tested) | 50 | 70 | 90 |

What is claimed is:

1. A flame retardant composition having a transmittance of greater than or equal to 80% comprising a uniform, miscible blend of
   a polycarbonate resin;
   a cycloaliphatic polyester resin, said cycloaliphatic resin comprising residues of a cyclic or straight chain aliphatic C2–C20 diol and residues of a cyclic or straight chain aliphatic C6–C20 diacid, wherein at least 80% of the residues are residues of a cyclic diol, or diacid, and wherein the weight ratio of polycarbonate resin to polyester resin is from 99/1 to 98/2; and
   a stabilizer selected from the group consisting of phosphorus oxo acids, acid organo phosphates, acid organo phosphites, acid phosphate metal salts, acidic phosphite metal salts and mixtures thereof.

2. A flame retardant composition of claim 1 wherein the composition has a melt volume rate according ISO-1133 of about 5 to about 25.

3. A fine retardant composition of claim 1 wherein the composition has a melt volume rate according ISO-1133 of about 5 to about 11.

4. A flame retardant composition of claim 1 where the composition has a glass transition temperature of about 60 to 150° C.

5. The composition of claim 1, wherein the cycloaliphatic polyester resin is polycyclohexane dimethanol cyclohexane dicarboxylate resin.

6. A flame retardant composition of claim 5 wherein the polycarbonate is bisphenol-A-polycarbonate.

7. A flame retardant composition of claim 6 where the polycyclohexane dimethanol cyclohexane dicarboxylate resin comprises less than or equal to 5 wt % of the total weight of the composition.

8. An extruded sheet comprising the composition of claim 1.

9. A shaped article comprising the composition of claim 1.

10. A shaped article of claim 9 further comprising a glazing material.

11. A shaped article of claim 9 wherein said article is shaped by injection molding, extrusion, blow molding, or vacuum forming.

12. An extruded sheet of claim 8 wherein the sheet is a solid sheet, multi-wall sheet, profiled sheet, or coextruded sheet.

13. An extruded sheet of claim 8 wherein having a weight from about 0.5 to about 15 kilograms per square meter.

14. An extruded sheet of claim 8 having a thickness from about 0.5 mm to about 15 mm.

15. An extruded sheet of claim 8 having a thickness from about 1 mm to about 12 mm.

16. An extruded sheet of claim 8 having a weight from about 0.5 to about 8 kilograms.

17. An extruded sheet of claim 8 having a thickness of about 2 to about 50 mm.

18. An extruded sheet of claim 8 having a thickness from about 4 to about 40 mm.

19. A fine retardant composition of claim 1 wherein the Vicat is 141° C. to 146° C.

* * * * *